W. G. SHELTON.
ELECTRIC SWITCH.
APPLICATION FILED SEPT. 11, 1916.

1,249,526.

Patented Dec. 11, 1917.

WITNESS:
René Bruine

INVENTOR:
William Gentry Shelton

By Attorneys,
Chaser, Dirk & Myers

UNITED STATES PATENT OFFICE.

WILLIAM GENTRY SHELTON, OF NEW YORK, N. Y.

ELECTRIC SWITCH.

1,249,526.   Specification of Letters Patent.   Patented Dec. 11, 1917.

Application filed September 11, 1916. Serial No. 119,430.

*To all whom it may concern:*

Be it known that I, WILLIAM GENTRY SHELTON, a citizen of the United States of America, residing in the borough of Manhattan, city, county, and State of New York, have invented certain new and useful Improvements in Electric Switches, of which the following is a specification.

The object of this invention is to provide means for starting an electric motor at higher than its normal running speed, whereby it instantly overcomes the inertia of the driven part. This invention is peculiarly adapted for use in connection with small motors for driving light loads, but which must, from the very nature of the work performed, be started from a state of rest and almost instantly acquire the proper normal running speed. This is particularly true in connection with the rotation of talking machine records and the electric motor for driving the same.

In the drawings accompanying this specification one practicable embodiment of the invention is illustrated. In such drawings,—

Figure 1:
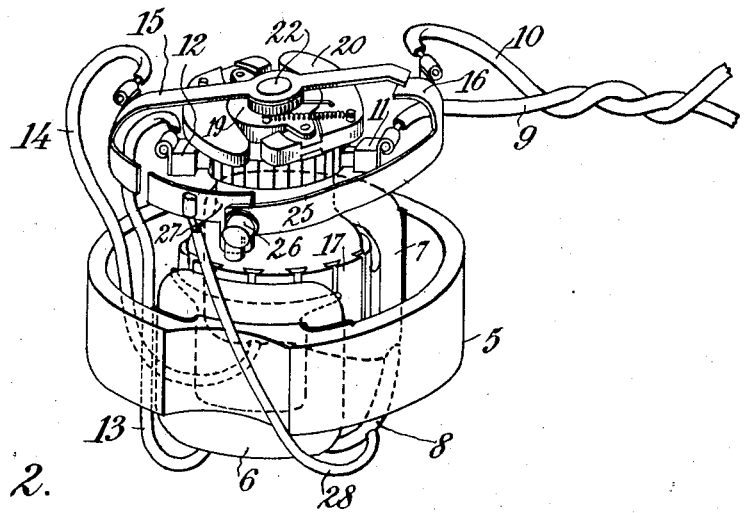
Figure 1 is a perspective view of the operative parts making up the invention, and the parts of the motor associated therewith, the arrangement being diagrammatic.
Figure 2:
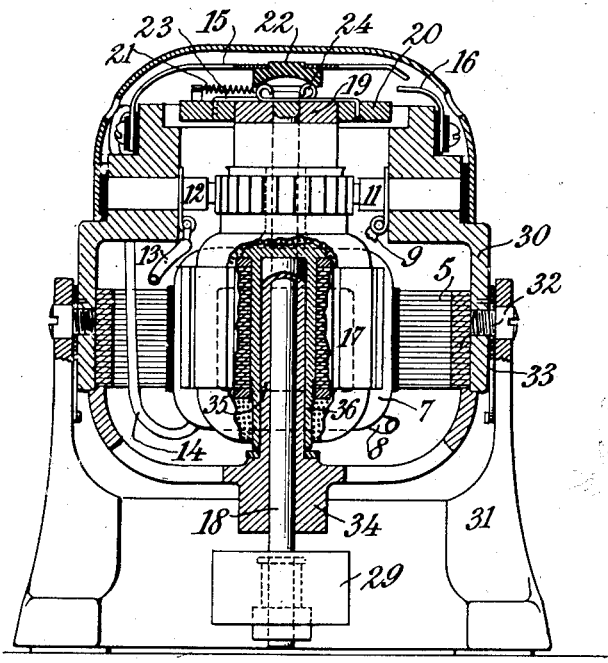
Fig. 2 is a view, partly in elevation and partly in longitudinal section, of a motor equipped with my improvements.
Figure 3:
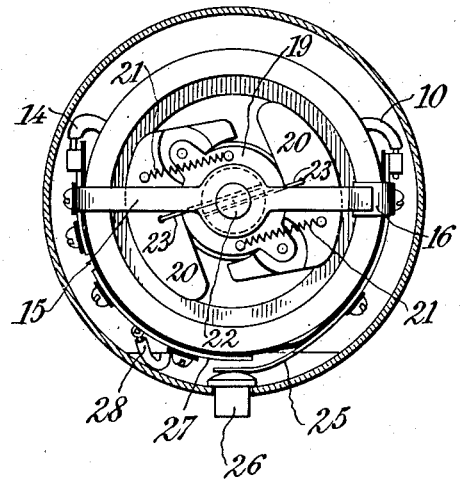
Fig. 3 is a top view of the parts shown in Fig. 2, the outer casing being shown in cross-section.
Figure 4:
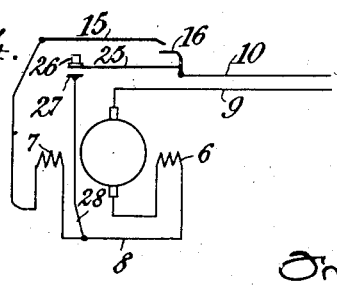
Fig. 4 is a diagram of the circuit.

The illustrative embodiment of the invention shown in the drawings is a full sized commercial form of motor for driving a governor-controlled talking machine record-supporting platen. The motor is assumed to have a sufficient number of convolutions in the field winding to give sufficiently slow speed to drive the platen at approximately the correct speed, or slightly faster, the true speed being maintained by the governor. The illustrated motor is intended for an alternating current, the laminated field ring being indicated by the reference character 5 and the field windings by the reference characters 6 and 7 respectively. The field windings are shown connected by a conductor 8. The current is led into the motor in the present instance by means of a cable consisting of conductors 9 and 10. The conductor 9 is shown connected to the commutator brush 11. The other commutator brush 12 is shown connected by means of a conductor 13 with the commencement of the field winding 6. The ending of the field winding 7 is shown connected by means of a conductor 14 with one member 15 of a circuit closer or switch, the other member 16 of such circuit closer being shown connected to the conductor 10. It will thus be seen that when the circuit closing members 15 and 16 of the switch are in engagement the normal circuit of the motor is closed.

The switch, of which the circuit closing members 15 and 16 are a part, is automatic in its operation, or, rather, is automatically controlled by the rotary element of the motor, in the present instance the armature 17. The switch is held in its open position when the parts are at rest, and the circuit closing parts automatically assume a closed position upon the attainment of sufficient motor speed to assure the proper running of the mechanism. This automatic control in the present illustration is effected by mechanism of the governor type. The motor shaft 18, to which the armature is fast, is shown provided with a hub 19 to which are pivotally mounted a pair of weights 20 adapted to act after the analogy of governor weights. Each of these weights is drawn inwardly toward the shaft by means of an extension spring 21, and upon rotation of the shaft is moved outwardly against the action of such spring. The contact member 15 is shown as resilient, and may be termed a "spring contact member." The members 15 and 16 are, by virtue of the resiliency of such member 15, normally in contact for closing the circuit. The spring member 15 is shown carrying a saucer-shaped engaging button 22 having the center of its concave surface located in alinement with the center of the shaft 18. Each weight 20 is shown pivotally carrying an actuator 23, such actuator being illustrated in the form of a wire having a bent over end entering a hollow in the weight and having its free end crossing the motor shaft when the weights are in idle position, such free end being provided with a loop 24. The actuators and loops are so proportioned relatively to the parts that when the weights are thrown out, due to the centrifugal action of the motor shaft, the loops substantially coincide and are located within the deepest portion of the button 22, whereby the spring contact 15 is permitted to act and come into engagement with its coöperative contact 16. When, however, the motor shaft is at rest and the weights 20 are drawn inwardly responsive to their springs, the actuator loops 24 are pressed across the shaft in opposite directions and engage the sloping sides of the button 22 and raise the member 15 against the action of its spring, thereby separating the members 15 and 16 and interrupting the circuit.

In the illustration the circuit-closing member 16 is shown formed of sheet metal and provided with a resilient extension 25 adapted upon being pressed inwardly by means of the push-button 26 to engage a contact 27 connected to a conductor 28 which is in electrical contact with the conductor 8 leading from one field coil to the other. When the contacts 25 and 27 are in engagement the switch embodying the contacts 15 and 16 is shunted, as is also the portion of the field winding embodied in the coil 7.

The motor casing 30 in the present illustration is shown pivoted to a base or supporting member 31 by means of removable pivots or trunnions in the form of screws 32. For the purpose of urging the driving pulley 29 to its work, springs connected to the casing and the base and surrounding the pivots, are illustrated at 33.

In the illustration the motor is of the single bearing type. The casing is shown provided with a hub 34 surrounding the armature shaft or spindle 18. The hub extends upwardly in the form of a sleeve 35 inside a sleeve 36 within the armature. The bearing is at the end or top of the sleeve 35, which is located well above the center of gravity of the armature and not far from the commutator.

The operation of the device is substantially as follows, assuming the motor to be used in connection with a talking machine and the driving pulley 29 to be in engagement with the record-supporting platen of such talking machine. Upon the record disk being properly placed in position upon the platen, the operator presses upon the push-button 26, thereby closing the circuit through part of the field winding, which causes the rotary element 17 of the motor and the driving pulley 29 to start with greater than the normal speed for which the motor is wound. This greater speed or tendency to speed, as the case may be, instantly overcomes the inertia of the driven parts. Upon the motor shaft 18 assuming a speed at or greater than its normal running speed, the weights 20 are thrown out and the contact member 15 permitted to engage the contact member 16. As long as the operator holds his finger upon the push-button 26 the switch members 15 and 16, of course, are shunted. As soon as the operator ascertains that the motor has overcome the inertia of the driven part he releases the push-button 26 and the normal circuit of the motor is established, and the parts proceed to operate in their usual manner until the motor is stalled, that is, either completely stopped or slowed down below a predetermined minimum, whereupon the governor weights 20 respond to their springs 21 and draw inwardly, at the same time breaking the circuit between the members 15 and 16 by raising the member 15.

The operator may, as an alternative in starting, spin the record platen forward by hand, thereby imparting mechanical motion to the rotary parts of the motor and establishing the proper electrical connections incident to the centrifugal action of the governor weights.

It is, of course, to be understood that the form of the invention shown herein is illustrative, and that changes may be made within the scope of the claims without departing from the spirit of the invention.

What I claim is:—

1. The combination with a motor, of a switch controlling the motor circuit, means adapted to operate the switch to close and open the circuit respectively upon the rotary element acquiring normal speed or falling below the same, and a normally open manually-actuated switch adapted upon being closed to shunt the first recited switch and a portion of the motor windings, said manually-operated switch being adapted to automatically open upon its release by the operator.

2. The combination with an electric motor, of a switch controlling the circuit of such motor, and means controlled by the rotary element of the motor for actuating the switch for closing the circuit when the rotary element acquires a predetermined speed upon starting and adapted to break such circuit when the motor is stalled, a normally open manually-operated switch adapted upon being closed to establish a starting circuit for the motor, shunt the first-recited switch and a portion of the windings of the motor to thereby establish a starting circuit for the motor, and means for automatically opening said manually-operated switch upon its release by the operator.

3. The combination with a motor, of a switch controlling the motor circuit, governor weights connected with the rotary element of the motor and adapted to close and open the circuit respectively upon the rotary element acquiring normal speed or falling below the same, and a normally open manually-actuated switch adapted upon being closed to shunt the first-recited switch and a portion of the motor windings, and means for automatically opening said manually-operated switch upon its release by the operator.

4. The combination with a motor, of a centrifugal switch for controlling the circuit thereof, starting means including a normally open manually-actuated circuit closer adapted on being closed to shunt the said switch and some of the windings of the motor and establish a starting circuit for the motor, and means for automatically opening said manually-operated switch upon its release by the operator.

In witness whereof, I have hereunto signed my name in the presence of two subscribing witnesses.

WILLIAM GENTRY SHELTON.

Witnesses:
CHAS. LYON RUSSELL,
THOMAS F. WALLACE.